United States Patent Office 3,793,382
Patented Feb. 19, 1974

3,793,382
PROCESS FOR PREPARING 5-ALKYLIDENE-2-NORBORNENE
Masaru Higuchi and Ryoshu Suzuki, Ohimachi, Japan, assignors to Daicel Ltd., Osaka, Japan
No Drawing. Filed Dec. 16, 1971, Ser. No. 208,910
Claims priority, application Japan, Dec. 22, 1970, 45/116,481
Int. Cl. C07c 5/24
U.S. Cl. 260—666 PY          6 Claims

ABSTRACT OF THE DISCLOSURE

A process for preparing 5-alkylidene-2-norbornene which is characterized by treating 5-(1-alkenyl)-2-norbornene in the gas phase using a catalyst which comprises an alkali metal supported on alumina from which molecular oxygen and water have been removed.

BACKGROUND OF THE INVENTION

Field of the invention

The present invention relates to a process for preparing 5-alkylidene-2-norbornene.

The compound of the invention is a very useful substance. For example, it can be used as a diene component which gives a vulcanization property to EPDM rubber produced from ethylene and propylene as raw materials.

The general reaction scheme of the present invention is shown in the following equation which is an isomerization reaction in which a double bond transfers.

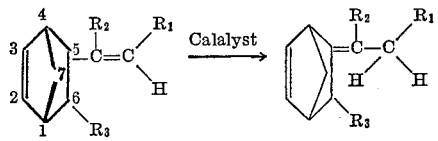

The 5-(1-alkenyl)-2-norbornene which is isomerized in the present invention is represented by the following formula.

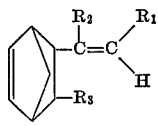

wherein $R_1$, $R_2$ and $R_3$ are each a hydrogen atom or an alkyl group having 1–6 carbon atoms. The compound represented by the above-mentioned formula can be prepared by the known Diels-Alder reaction of cyclopentadiene and a diene represented by

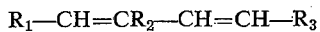

$$R_1-CH=CR_2-CH=CH-R_3$$

or by a thermal cracking reaction of β-(5-norbornene-2-yl)-β-propiolactone.

Description of the prior art

Hitherto, as the processes for preparing 5-alkylidene-2-norbornene, there have been known (I) a process which comprises contacting 5-(1-alkenyl)-2-norbornene with a basic catalyst consisting of (a) metallic lithium, sodium or potassium deposited on a carrier which has a surface area of at least 30 m.² per g., or (b) a mixture of a strong base of said alkali metal and a dipolar aprotic solvent which is liquid under the operating conditions, or (c) a mixture of an amide of said alkali metal and a nitrogen base having at least a hydrogen atom bound to the nitrogen atom and which is liquid under the operating conditions (Jap. pat. pub. No. 24,138/70), and (II) a process which comprises contacting 5-(1-alkenyl)-2-norbornene with iron pentacarbonyl catalyst (Japanese pat. pub. No. 23,337/70). However, one of these processes has a low isomerization yield. On the other hand, in the process having a high isomerization yield, the reaction period is long and the activity of the catalyst deteriorates during the reaction, which makes the operation complicated. Further, it is necessary to separate the catalyst and the solvent after the reaction is complete.

SUMMARY OF THE INVENTION

We have studied the isomerization reaction of 5-(1-alkenyl)-2-norbornene using a catalyst which comprises an alkali metal supported on alumina. We have discovered that molecular oxygen and water have a great influence on this isomerization reaction and that they must be removed from such a catalyst in order for the reaction to proceed satisfactorily. Although the details of the mechanism of the function of molecular oxygen and water are not understood, it is clear that they deteriorate the alkali metal supported on the surface of alumina, thereby to lower the functional efficiency of the catalyst.

The process of the present invention is carried out by a gas phase reaction. It is necessary to remove the molecular oxygen and water both from the reaction atmosphere, and from the alumina prior to and during the reaction, because they deteriorate the activity of the catalyst.

In the present invention, alumina which contains molecular oxygen and some amount of water is kept at a temperature of more than 200° C., preferably at 300 to 800° C., in the presence of an inert gas or under a reduced pressure in order to remove the molecular oxygen and the water in the alumina, thereby to give a high isomerization capacity. As the inert gas, there can be used nitrogen, helium, neon, argon, hydrogen, ammonia, methane and mixtures of two or more of them. As the carrier, any type of alumina may be used, for example, α-, β-, γ-, δ-, κ- and ζ-alumina. The surface area of the alumina is more than 1 m.²/g. and preferably more than 10 m.²/g.

The catalyst used in the present invention is one in which an alkali metal selected from lithium, sodium, potassium, rubidium, and cesium is supported on an alumina carrier from which oxygen and water have been removed at more than 200° C. as above described. The catalyst is easily prepared by making a homogeneous dispersion or solution by dissolving the alkali metal in a suitable solvent, such as liquid ammonia, in the absence of molecular oxygen and water, spraying this liquid onto the carrier or dipping the carrier in said liquid, and then drying the carrier to cause the alkali metal to adhere homogeneously to the surface of the carrier.

The ratio of the alkali metal to the carrier in the catalyst is not criitcal, and it is in the range of 0.01:1–0.5:1 parts by weight, preferably in the range of 0.05:1–0.20:1 parts by weight.

The reaction can be carried out by contacting a gas of 5-(1-alkenyl)-2-norbornene with the above-mentioned catalyst in a batch system, a continuous system or an intermittent system. The reaction is carried out preferably in the absence of molecular oxygen and water in the starting material to obtain a long operating life of the catalyst. In the reaction, 5-(1-alkenyl)-2-norbornene can be used alone or it may be diluted with an inert gas, that is nitrogen, helium and argon etc. Further, it may be diluted with a vapor of an inert organic material such as benzene, toluene, xylene, pentane, hexane, heptane, kerosene, ether, dioxane, and isopropyl ether etc.

Although the pressure of the reaction is related to the boiling point of the charged starting materials and the reaction temperature, the reaction pressure is not critical and the reaction can be carried out at a reduced pressure, atmospheric pressure or super atmospheric pressure.

The temperature of the reaction is dependent on the reaction pressure used. But it is not necessary to limit the reaction temperature within a narrow range. Thus the reaction can be carried out easily at a temperature of from room temperature (20° C.) to 300° C. or more. Usually, when the reaction is carried out at low temperatures, the reaction rate is reduced and the conversion rate becomes low. On the other hand, when the temperature is high, side reactions can occur. Preferably, the reaction is carried out at 70–200° C. When the 5-(1-alkenyl)-2-norbornene is diluted with an inert gas such as nitrogen, it is not unreasonable to regard the reaction as a gas phase reaction, because when the reaction temperature is lower than the boiling point of 5-(1-alkenyl)-2-norbornene, it is possible to charge same in an amount corresponding to the saturated vapor pressure at said temperature into the reaction system.

Further, by purifying the starting materials and the inert gas used by removing molecular oxygen and water, the catalyst will maintain its activity for a long period of time.

Thus, it is possible by the process of the present invention to prepare 5-alkylidene-2-norbornene at a quantitative conversion rate and yield, in a short period of time, by a simple method which comprises contacting gaseous 5-(1-alkenyl)-2-norbornene with a fixed or fluidized catalyst layer.

As has been explained already, since the process of the present invention is carried out in the gas phase, the apparatus is of relatively small size as compared with the prior art and a continuous operation can be easily practiced. Further the space time yield can be changed freely. Furthermore, the present invention provides a very useful technique which has various advantages including the advantages that the period of contact is short, side reactions such as polymerization do not proceed substantially, the activity of the catalyst is maintained for a long period of time and separation of the catalyst is unnecessary.

In the following illustrative examples of processes for preparing 5-alkylidene-2-norbornene, according to the present invention, will be presented.

EXAMPLE 1

Thirty (30) parts by volume of liquid ammonia was introduced under cooling into a flask which was substituted by nitrogen, and 1 part by weight of metallic sodium was dissolved therein. To this solution was added 10 parts by weight of α-alumina (surface area: 23 m.$^2$/g.) which had been dried for 10 hours at 400° C. under a reduced pressure (2 mm. Hg). After stirring for 30 minutes, the liquid ammonia was removed by distillation and the obtained sodium catalyst supported on the alumina carrier was preserved in the nitrogen atmosphere.

A glass tube having a diameter of 3.5 mm. and a length of 25 cm. was filled with 1.89 g. of this catalyst. Gaseous 5-vinyl-2-norbornene was charged into the tube at a reaction temperature of 150° C. in a nitrogen stream (45 cc./minute) and there was obtained 5-ethylidene-2-norbornene at an isomerization yield of 96.7%.

Comparative Example

For comparison, alumina which had not been subjected to the above-described dehydration and oxygen-removing treatments was used as the carrier. The other conditions were the same. In this case, isomerization was not observed at a reaction temperature of 150° C.

EXAMPLE 2

A catalyst was prepared by causing 1 part by weight of metallic sodium to adhere to 10 parts by weight of α-alumina by the same procedure as described in Example 1. The influence on the reaction of the presence of oxygen and water in the gaseous starting material was examined.

(A) The same reaction tube as in Example 1 was filled with 1.81 g. of this catalyst. 2-vinyl-2-norbornene was charged continuously at a reaction temperature of 150° C. in a nitrogen stream (20 cc./minute), without removing oxygen and water sufficiently. 5-ethylidene-2-norbornene was initially obtained in at an isomerization yield of 95.1%. But the catalytic activity was lost completely after 2.5 hours and the isomerization yield became 0.3%.

(B) Using the same reaction tube as in (A) and 2.75 g. of catalyst, 5-vinyl-2-norbornene was charged continuously at a reaction temperature of 150° C. in a nitrogen stream (50 cc./minute) from which water and oxygen were removed completely (remaining oxygen: less than 0.1 p.p.m.; dew point: less than −70° C.), 5-ethylidene-2-norbornene was prepared at an isomerization yield of 96.3%. After passage of 17 hours of operation, 5-ethylidene-2-norbornene was prepared at an isomerization yield of 94.9%.

EXAMPLE 3

A potassium-alumina catalyst was prepared by causing 1.70 parts by weight of metallic potassium to adhere to 10 parts by weight of alumina (α-alumina: surface area=23 m.$^2$/g.) by the same procedure as described in Example 1. The same reaction tube as in Example 1 was filled with 2.01 g. of this catalyst and was heated to 150° C. There was introduced continuously 5-vinyl-2-norbornene together with nitrogen gas. 5-ethylidene-2-norbornene was prepared at an isomerization yield of 94.2%. After 5 hours operation, the 5-ethylidene-2-norbornene was prepared at an isomerization yield of 93.8%. The spacetime yield (STY) of this reaction was 200 kg./hr. m.$^3$.

In order to examine the polymerization occurring during the reaction, a liquid mixture of toluene and 5-vinyl-2-norbornene (toluene: 51.78%) was charged to this potassium-alumina catalyst at 150° C. By gas-chromatography analysis, it was found that the amount of toluene after isomerization was 51.62%. From this result, it was assumed that polymerization did not occur substantially during the reaction.

EXAMPLE 4

There was used 3.04 g. of the same potassium-alumina catalyst as used in Example 3. The reaction system was kept under 100–80 mm. Hg of reduced pressure. 5-vinyl-2-norbornene was charged continuously to the reaction tube at 70–75° C. 5-ethylidene-2-norbornene was prepared at an isomerization yield of 97.7%. The isomerization yield after 14 hours operation was 98.8%.

EXAMPLE 5

A rubidium-alumina catalyst was prepared by causing 0.91 part by weight of metallic rubidium to adhere to 5 parts by weight of alumina by the same procedure as described in Example 1. Using 2.87 g. of this catalyst, 5-ethylidene-2-norbornene was prepared at an isomerization yield of 91.5% by charging to the reaction tube 5-vinyl-2-norbornene together with nitrogen gas at 100° C.

EXAMPLE 6

A potassium-alumina catalyst was prepared by causing 1.70 parts by weight of metallic potassium to adhere to 10 parts by weight of alumina by the same procedure as described in Example 1. Using 2.84 g. of this catalyst, 5 - ethylidene - 6 - methyl - 2 - norbornene was prepared at an isomerization yield of 97.6% by charging 5-vinyl-6-methyl-2-norbornene together with a nitrogen gas at 100° C.

EXAMPLE 7

5-isopropylidene - 2 - norbornene was prepared at an isomerization yield of 95.6% by treating 5-isopropenyl-2-norbornene, using a potassium-alumina catalyst prepared by the same procedure as in Example 3.

EXAMPLE 8

5-propylidene - 2 - norbornene was prepared at an isomerization yield of 90.3% by treating 5-propenyl-2-norbornene, using a potassium-aluminum catalyst prepared by the same procedure as in Example 3.

The embodiments of the invention in which an exclusive property or privilege is claimed are defined as follows:

1. A process for preparing 5-alkylidene-2-norbornene of the formula

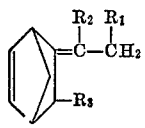   (I)

wherein $R_1$, $R_2$ and $R_3$ are hydrogen or alkyl having from 1 to 6 carbon atoms, by isomerization of 5-(1-alkenyl)-2-norbornene of the formula

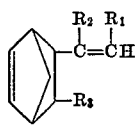   (II)

wherein $R_1$, $R_2$ and $R_3$ have the same meaning as above, which comprises contacting gaseous 5-(1-alkenyl)-2-norbornene free of molecular oxygen and water, in an inert gas atmosphere free of molecular oxygen and water, with a catalyst consisting of alkali metal supported on alumina having a surface area of more than 1 m.$^2$/g., said catalyst being free of molecular oxygen and water, the contacting being carried out in the absence of molecular oxygen and water, at a temperature in the range of about 20 to 300° C., at a pressure effective to maintain the 5-(1-alkenyl) - 2 - norbornene in the gas phase, for a time period effective to cause said 5-(1-alkenyl)-2-norbornene to be substantially completely isomerized to 5-alkylidene-2-norbornene.

2. A process according to claim 1, in which the catalyst is prepared by maintaining the alumina at a temperature of at least about 200° C. in an inert gas atmosphere until the alumina is free of molecular oxygen and water and then depositing said alkali metal on the alumina in the absence of molecular oxygen and water.

3. A process according to claim 1, in which the weight ratio of alkali metal to alumina is in the range of 0.01:1 to 0.5:1:

4. A process according to claim 1, in which the gaseous 5-(1-alkenyl)-2-norbornene is diluted with an inert gas.

5. A process according to claim 1, in which the 5-(1-alkenyl)-2-norbornene is 5-vinyl-2-norbornene.

6. A process according to claim 5, in which the 5-(1-alkenyl)-2-norbornene is selected from the group of 5-vinyl - 6 - methyl - 2 - norbornene, 5-isopropenyl-2-norbornene and 5-propenyl-2-norbornene.

References Cited
UNITED STATES PATENTS 3,347,944   10/1967   Fritz et al. _____ 260—666 PY
3,577,473   5/1971   Nagase et al. ____ 260—666 PY DELBERT E. GANTZ, Primary Examiner
V. O'KEEFE, Assistant Examiner